United States Patent
DeFrancisci

(10) Patent No.: US 12,082,589 B1
(45) Date of Patent: Sep. 10, 2024

(54) PASTA ROLLING MACHINE WITH THICKNESS CONTROL

(71) Applicant: DeFrancisci Machine Company LLC, Melbourne, FL (US)

(72) Inventor: Leonard J. DeFrancisci, Melbourne, FL (US)

(73) Assignee: DeFrancisci Machine Company LLC, Melbourne, FL (US)

( * ) Notice: Subject to any disclaimer, the term of this patent is extended or adjusted under 35 U.S.C. 154(b) by 0 days.

(21) Appl. No.: 17/934,225

(22) Filed: Sep. 22, 2022

Related U.S. Application Data

(63) Continuation of application No. 15/811,842, filed on Nov. 14, 2017, now abandoned.

(51) Int. Cl.
  *A21C 3/02* (2006.01)
  *A21C 11/22* (2006.01)
  *A23L 7/109* (2016.01)

(52) U.S. Cl.
  CPC .............. *A21C 3/021* (2013.01); *A21C 11/22* (2013.01); *A23L 7/109* (2016.08)

(58) Field of Classification Search
  CPC ............ A21C 3/021; A21C 1/22; A23L 7/109
  See application file for complete search history.

(56) References Cited

U.S. PATENT DOCUMENTS

| | | |
|---|---|---|
| 1,357,001 A | 10/1920 | Priborsky |
| 1,505,851 A | 8/1924 | Bloom |
| 1,556,887 A | 10/1925 | Winters |
| 1,650,758 A | 11/1927 | Kukla |
| 1,732,142 A | 10/1929 | Samard |
| 1,810,050 A | 6/1931 | Klempp |
| 2,490,616 A | 12/1949 | Brabazon |
| 2,652,009 A | 9/1953 | Mees, Sr. |
| 3,157,135 A | 11/1964 | Fetrow et al. |
| 3,244,122 A | 4/1966 | Agler |
| 3,322,076 A | 5/1967 | Cronheim |
| 3,605,648 A | 9/1971 | Petix et al. |
| 4,045,850 A | 9/1977 | Brandes |
| 4,426,200 A | 1/1984 | Muller |
| 5,546,850 A | 8/1996 | Zaveri |
| 5,811,137 A * | 9/1998 | Clark ........................ A21C 3/02 100/168 |

(Continued)

FOREIGN PATENT DOCUMENTS

IT 201800008231 A1 * 8/2018 ............... A21C 3/02

*Primary Examiner* — Jason L Vaughan
(74) *Attorney, Agent, or Firm* — ALLEN, DYER ET EL

(57) ABSTRACT

A pasta rolling machine includes a first roller extending along a first axis and having a first outer surface circumferential thereto and a second roller extending along a second axis and having a second outer surface circumferential thereto. A mounting bracket rotatably supports the first and second rollers within first and second bracket openings, the first and second axes spaced apart such that a gap is defined between closest points of the first and second outer surfaces. A first mounting plate is connected to the mounting bracket adjacent to the second bracket opening and rotatably supporting the second roller within a first mounting plate opening. The first plate opening is eccentrically mounted within the first plate such that the gap is adjustable by rotating the first plate without translation relative to the mounting bracket.

17 Claims, 4 Drawing Sheets

(56) References Cited

U.S. PATENT DOCUMENTS

| | | | |
|---|---|---|---|
| D623,467 S * | 9/2010 | Lin | D7/368 |
| 8,512,026 B1 * | 8/2013 | Voyatzakis | A21C 3/028 |
| | | | 425/374 |
| 8,740,602 B2 * | 6/2014 | Ruhe | A21C 1/006 |
| | | | 425/363 |
| 11,844,355 B2 * | 12/2023 | Álvarez Granda | A21C 3/025 |
| 2002/0025365 A1 | 2/2002 | DeFrancisci | |
| 2002/0094921 A1 | 7/2002 | Jerstrom et al. | |
| 2002/0116767 A1 | 8/2002 | Hefti et al. | |
| 2004/0173062 A1 | 9/2004 | DeFrancisci | |
| 2012/0225151 A1 | 9/2012 | Ruhe | |

* cited by examiner

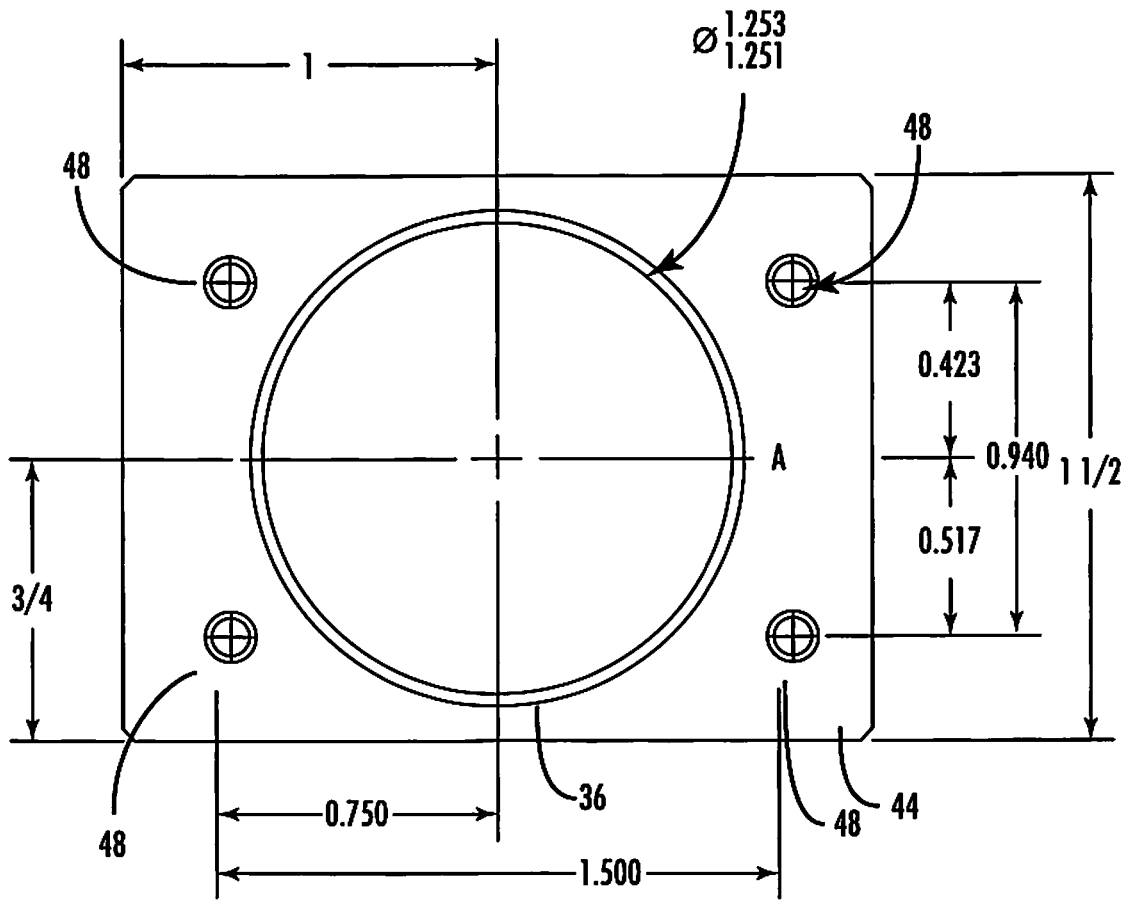

*FIG. 5*

| DISPOSE A FIRST ROLLER AND A SECOND ROLLER ON A MOUNTING BRACKET SUCH THAT OUTER SURFACES OF THE FIRST AND SECOND ROLLERS DEFINE A GAP | 602 |

| DISPOSE TWO ROLLER MOUNTING PLATES AT OPPOSED ENDS OF THE SECOND ROLLER OF THE ROLLING MACHINE, EACH OF THE MOUNTING PLATES HAS AN ECCENTRIC OPENING TO RECEIVE THE SECOND ROLLER WITH IN A PERIPHERAL FLANGE | 604 |

| SELECTIVELY ALIGN THE RESPECTIVE MOUNTING PLATES TO A PLURALITY OF ACCURATELY SPACED HOLES ON THE MOUNTING BRACKET OF THE ROLLING MACHINE | 606 |

*FIG. 6*

PASTA ROLLING MACHINE WITH THICKNESS CONTROL

CROSS-REFERENCE TO RELATED APPLICATION

This application is a continuation of U.S. patent application Ser. No. 15/811,842, filed on Nov. 14, 2017, the contents of which application is incorporated by reference in its entirety.

FIELD OF THE INVENTION

The present invention relates to a rolling machine, and more particularly, to a rolling machine for controlling the thickness of pasta.

BACKGROUND OF THE INVENTION

Machines for the domestic or commercial production of pasta have been on the market for many years. Dough made of durum or bread wheat flour, eggs and water are prepared and introduced between a pair of smooth rollers in the pasta rolling machine, yielding flat and generally even pasta sheets. The thickness of the sheet can be adjusted by the changing the gap between the two roller surfaces. Some pasta rolling machines available today employ a regulating knob or dial to control dough sheet thickness, but further improvements are possible.

SUMMARY OF THE INVENTION

In view of the foregoing, it is an object of the present invention to provide an improved pasta rolling machine. According to one embodiment of the present invention, a pasta rolling machine includes a first roller extending along a first axis and having a first outer surface circumferential thereto. The pasta rolling machine further includes a second roller extending along a second axis and having a second outer surface circumferential thereto. A mounting bracket rotatably supports the first and second rollers within first and second bracket openings. The first and second axes are spaced apart such that a gap is defined between closest points of the first and second outer surfaces. The second bracket opening is elongated such that movement of the second roller therein adjusts the gap. A first mounting plate is connected to the mounting bracket adjacent to the second bracket opening and rotatably supporting the second roller within a first mounting plate openings. The first plate opening is eccentrically mounted within the first mounting plate such that the gap is adjustable by rotating the first mounting plate without translation relative to the mounting bracket. A roller driver is configured to rotate at least one of the first and second rollers.

According to another embodiment of the present invention, a method of adjusting a gap between a first roller and a second roller of a pasta rolling machine includes disposing the first roller and the second roller on a mounting bracket such that closest points on outer surfaces of the first and second rollers define a gap. Two roller mounting plates are connected to the mounting bracket at opposed ends of the second roller for rotatably supporting the second roller. The two mounting plates each has an eccentric opening to receive the second roller within respective peripheral flanges. The respective mounting plates are selectively aligned to a plurality of accurately spaced holes on the mounting bracket of the rolling machine to adjust the gap between the first roller and the second roller.

These and other objects, aspects and advantages of the present invention will be better appreciated in view of the drawings and following detailed description of preferred embodiments.

BRIEF DESCRIPTION OF THE DRAWINGS

FIG. 5 is a front view of a roller mount plate according to another embodiment of the present invention; and FIG. 6 is a flowchart illustrating a method of adjusting a gap between a first roller and a second roller of a pasta rolling machine.

DETAILED DESCRIPTION OF PREFERRED EMBODIMENTS

Figure 1:
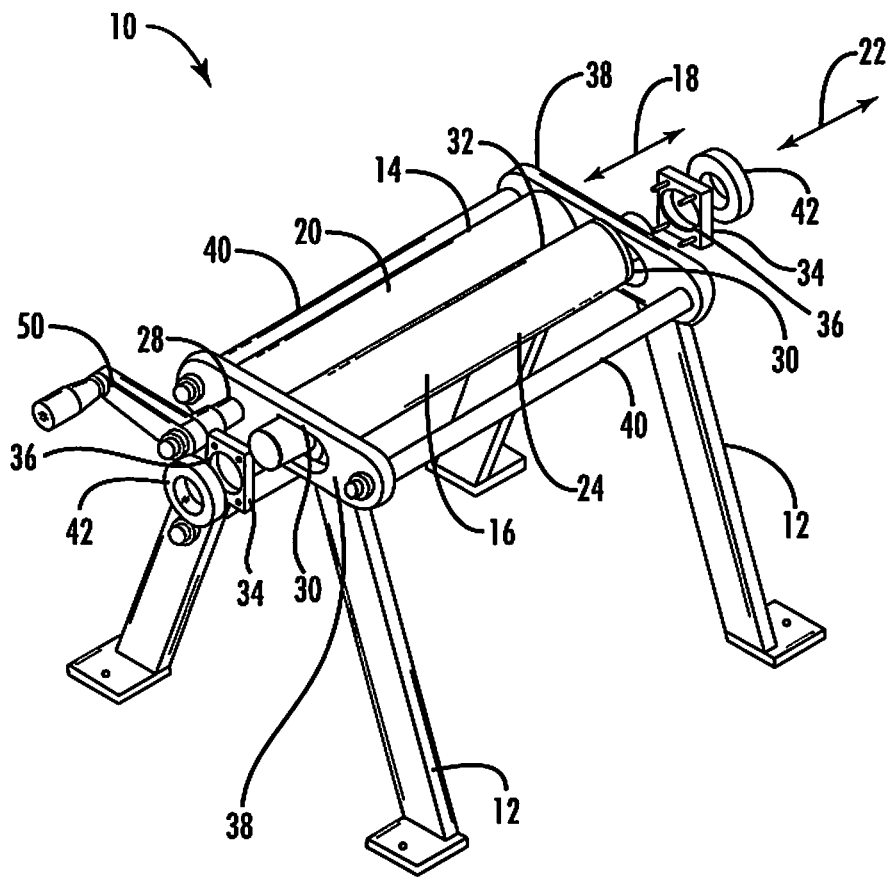
FIG. 1 is a perspective view of pasta rolling machine, according to an embodiment of the present invention.
Figure 2:
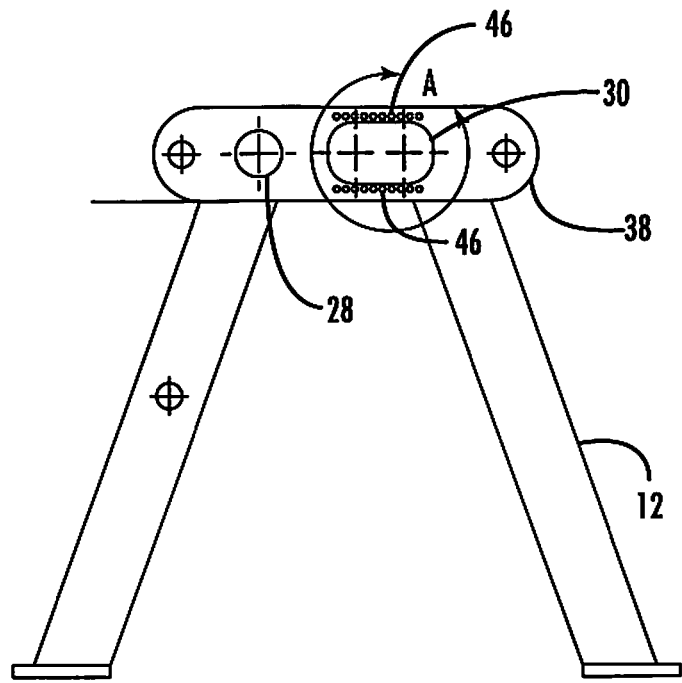
FIG. 2 is a left side view of a mounting bracket of the rolling machine of FIG. 1, the right side view of the mounting bracket is a mirror image thereof.

Referring to FIGS. 1-2, a pasta rolling machine 10 includes a mounting bracket 12 for rotatably supporting the first roller 14 and the second roller 16.

The first roller 14 extends along a first axis 18 and having a first outer surface 20 circumferential thereto. The second roller 16 extends along a second axis 22 and has a second outer surface 24 circumferential thereto. The mounting bracket 12 rotatably supports the first and second rollers 14 and 16 within first and second bracket openings 28 and 30. The first and second axes 18 and 22 are spaced apart such that a gap 32 is defined between closest points of the first and second outer surfaces 20 and 24. The second bracket opening 30 is elongated such that movement of the second roller 16 therein adjusts the gap 32. A sheet of material (e.g., pasta) can be formed by forcing dough through the gap 32 between the first and second rollers 14 and 16. The thickness of this sheet will be determined by the size of the gap 32.

At least one roller mounting plate 34 is connected to the mounting bracket 12 adjacent to the second bracket opening 30 and rotatably supporting the second roller 16 within a plate opening 36. The mounting plate opening 36 is eccentrically mounted within the at least one roller mounting plate 34 such the gap 32 is adjustable by rotating the at least one roller mounting plate 34 without translation relative to the mounting bracket 12.

In the depicted embodiment, the first roller 14 is in a fixed position and two roller mounting plates 34 are disposed at opposed ends of the second roller 16 and adjacent to the second openings 30 of the mounting bracket 12. The mounting bracket 12 includes two side frames 38 with a plurality of parallel cross bars 40 connected therebetween. The respective roller mounting plates 34 can be further secured by respective knobs 42.

The first roller 14 and the second roller 16 are generally cylindrical and have smooth surfaces. The first and second rollers 14 and 16 are preferably similar in size and shape, though it is understood that the first and second rollers can have different dimensions if required for a specific purpose.

Figure 3:
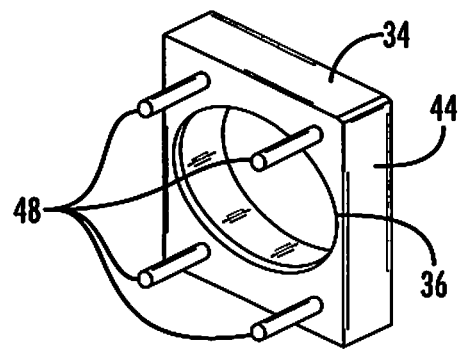
FIG. 3 is a perspective view of a roller mounting plate of the pasta rolling machine of FIG. 1, according to one embodiment of the present invention.
Figure 4:
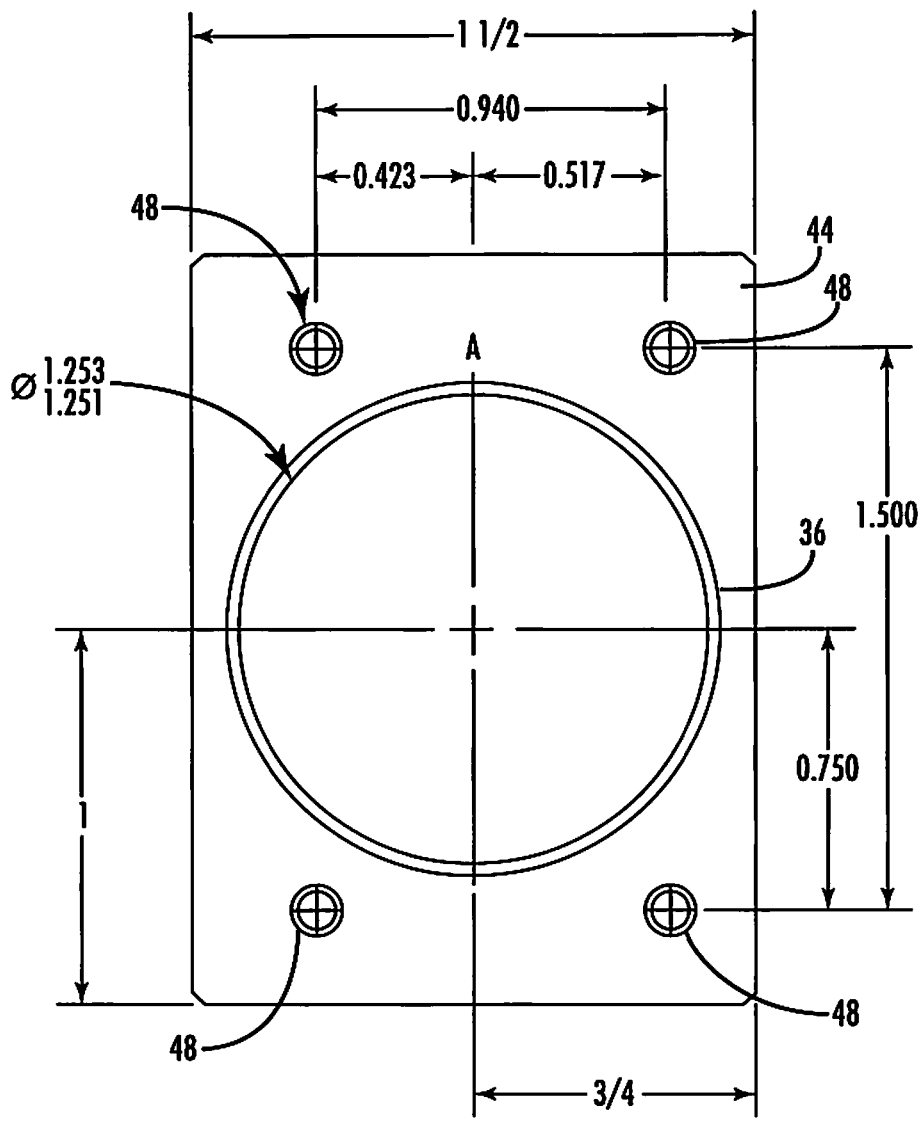
FIG. 4 is a front view of a roller mounting plate of FIG. 3.

Referring to FIG. 3-4, the mounting plates 34 has the eccentric circular opening 36 configured to receive the second roller 16 within a rectangular peripheral flange 44. The selective alignment of the peripheral flange 44 to a plurality of accurately spaced holes 46 on the mounting bracket 12 will determine the gap 32 between the first and second rollers 14 and 16. A plurality of holes 46 are accurately spaced on the side frame 38 of the mounting bracket 12. Specifically, the plurality of accurately spaced holes 46 are positioned along top and bottom side of the second opening 30 on the side frame 38. The plurality of holes 46 are equally spaced 0.188 inches apart. Four pins 48 on the four corners of the peripheral flange 44 are configured to be aligned with corresponding holes 46 to achieve a desired size of the gap 32. There are thus multiple ways of aligning the four pins 48 on the peripheral flange 44 to the corresponding mounting holes 46 on the mounting bracket 12. The distance of the gap 32 can thus be adjusted by a fixed increment.

The opening 36 is eccentrically positioned within the peripheral flange 44. In one embodiment, the opening 36 is offset from a vertical center line between the four pins 48 by 0.047 inches. When the mounting plate 34 is turned 180 degrees, the opening 36 moves laterally by 0.094 inches. This design will enable twice as many adjustment positions for the same number of fixed holes in the side frame 38. The eccentric design of the opening 36 will double the possible distance between the first and second rollers 14 and 16. The mounting plate 34 will therefore have 9 possible mounting positions to control the thickness of a suitable material (e.g. pasta dough) from 0.012 inch to 0.1 inch. The opening 36 can also be offset from a horizontal center line between the four pins 48, as shown in FIG. 5. This will enable the mounting plate 34 to create even more possible dimensions for the gap 32.

The mounting plate 34 can also be turned 90 or 270 degrees, enabling the opening 36 to move laterally and horizontally for further control over the width of the gap 32. In this scenario, the first roller 14 can be configured to be vertically offset from its original position such that the first roller axis 18 remains in the same horizontal plane as that of the second roller 16. As such, the second roller 16 can set four different gaps 32 for any given set of four holes 46.

Referring back to FIG. 1, a first roller drive is configured to rotate the first roller 14 about the first axis 18. In the depicted embodiment, the first roller drive includes a crank handle 50 coupled with one end of the first roller 14. Alternatively or additionally, the pasta rolling machine 10 can also include an electric motor (not shown) to drive the roller handle 50 via a series of common gears and chains or belts (not shown), as known in the art.

Referring to FIG. 6, according to a method aspect of the present invention, a method of adjusting a gap between a first roller (e.g., roller 14) and a second roller (e.g., roller 16) includes, at step 602, disposing the first roller and the second roller on a mounting bracket (e.g., mounting bracket 12) such that closest point of the outer surfaces of the first and second rollers define a gap (e.g., gap 32). At step 604, two roller mounting plates (e.g., mounting plates 34) are disposed at opposed ends of the second roller of the pasta rolling machine 10. Each of the two mounting plates has an eccentrically positioned opening (e.g., opening 36) to receive the second roller within a peripheral flange (e.g., peripheral flange 44). At step 606, the peripheral flanges of the respective mounting plate 34 are selectively aligned to a plurality of accurately spaced holes (e.g., holes 46) on the mounting bracket 12 of the pasta rolling machine 10.

It should be noted that the gap adjustment can also be achieved by adjust the mounting positions of the first roller 14 in the same manner as the second roller 16. Specifically, the mounting positions of both the first and second rollers 14 and 16 can be adjusted via respective mounting plates 34. This will provide even more increment gap adjustment possibilities.

The present invention can be implemented in a manual or an automatic pasta rolling machine. In the manual case, a user can continuously turn a crank handle (e.g., crank handle 50) with one hand while feeding dough between the first and second rollers 14 and 16.

The pasta rolling device 10 can be used for any application that requires thickness control in the formation of a sheet from a suitable material. The rolling device 10 is depicted as a pasta rolling machine in the food industry and used to form grain-based doughs or doughy-like food mixtures.

For use in the food industry, all components of the rolling machine 10 that will come into contact with any food product are preferably made of stainless steel. As an example, the mounting bracket 12 can be made of mirror-polished chrome-plated steel and the smooth rollers 14 and 16 can also be made of anodized aluminum.

The foregoing is provided for illustrative and exemplary purposes; the present invention is not necessarily limited thereto. Rather, those skilled in the art will appreciate that various modifications, as well as adaptations to particular circumstances, are possible within the scope of the invention as herein shown and described.

What is claimed is:

1. A pasta rolling machine comprising:
a first roller extending along a first axis and having a first outer surface circumferential thereto;
a second roller extending along a second axis and having a second outer surface circumferential thereto;
a mounting bracket rotatably supporting the first and second rollers within first and second bracket openings, the first and second axes spaced apart such that a gap is defined between closest points of the first and second outer surfaces, the second bracket opening being elongated such that movement of the second roller therein adjusts the gap, the mounting bracket having a plurality of accurately spaced holes;
a first mounting plate connected to the mounting bracket adjacent to the second bracket opening and rotatably supporting the second roller within a first plate opening within a peripheral flange, the first plate opening being eccentrically mounted within the first mounting plate such the gap is adjustable by rotating the first mounting plate without translation relative to the mounting bracket, the first mounting plate having four pins on respective corners of the peripheral flange and configured for selectively aligning the first mounting plate to the plurality of accurately spaced holes of the mounting bracket; and
a roller drive configured to rotate at least one of the first and second rollers.

2. The pasta rolling machine of claim 1, further comprising a second mounting plate connected to the mounting bracket adjacent to the second bracket opening and rotatably supporting the second roller within a second plate opening, the second plate opening being eccentrically mounted within the second mounting plate such the gap is adjustable by rotating the second mounting plate without translation relative to the mounting bracket.

3. The pasta rolling machine of claim 1, wherein the eccentric first plate opening is offset from a vertical center line between the four pins on the four corners of the first mounting plate, such that rotating the first mounting plate 180 degrees adjusts the gap between the first and second rollers.

4. The pasta rolling machine of claim 1, wherein the first plate opening is offset from a vertical center line between the four pins on the four corners of the first mounting plate, such that rotating the first plate 90 degrees adjusts the gap between the first and second rollers.

5. The pasta rolling machine of claim 1, wherein the first mounting plate is connected to the mounting bracket adjacent to the second bracket opening via the plurality of accurately spaced openings on the mounting bracket.

6. The pasta rolling machine of claim 1, wherein the first roller is in a fixed position.

7. The pasta rolling machine of claim 1, wherein the position of the first roller is adjustable.

8. The pasta rolling machine of claim 1, wherein the first and second rollers are smooth rollers configured to press dough into a sheet of dough having a generally uniform thickness.

9. The pasta rolling machine of claim 1, wherein the roller drive comprises a crank handle configured to manually rotate the first roller about the first axis.

10. The pasta rolling machine of claim 1, wherein the mounting bracket includes two parallel side frames having the first and second bracket openings configured to support the first roller and the second roller respectively.

11. A method of adjusting a gap between a first smooth roller and a second smooth roller of a pasta rolling machine comprising:

disposing a first roller and a second roller on a mounting bracket of the pasta rolling machine such that closest points on outer surfaces of the first and second rollers define a gap;

disposing two roller mounting plates at opposed ends of the second roller of the pasta rolling machine, each of the mounting plates has an eccentric opening to receive the second roller within a peripheral flange; and selectively aligning the respective mounting plate to a plurality of accurately spaced holes on the mounting bracket of the pasta rolling machine;

wherein the roller mounting plate is rectangular shaped; and wherein selectively aligning the respective roller mounting plate to a plurality of accurately spaced holes on the mounting bracket includes aligning four pins on respective four corners of the peripheral flange of the respective mounting plate to the plurality of accurately spaced holes on the mounting bracket of the pasta rolling machine.

12. The method of claim 11, wherein selectively aligning the respective mounting plate to a plurality of accurately spaced holes on the mounting bracket includes:

rotating the respective mounting plates; and aligning four pins on four corners of the mounting plates to the plurality of accurately spaced holes on the mounting bracket of the pasta rolling machine.

13. The method of claim 12, wherein each of the respective mounting plates is rotated 180 degrees.

14. The method of claim 11 wherein the opening of each of the respective mounting plates is offset from a vertical center line between four of the pins on a respective four corners of the respective mounting plate.

15. The method of claim 11, further comprising driving a first roller about the first axis.

16. The method of claim 15, wherein driving the first roller about the first axis incudes driving the first roller via a crank handle directly coupled to the first roller.

17. The method of claim 11, further comprising pressing dough between the first and second rollers into a sheet of dough having a generally uniform thickness.

\* \* \* \* \*